Oct. 16, 1934.  E. G. MATHAUER  1,977,284
CABLE ACTUATED DOOR MECHANISM
Filed June 20, 1933   3 Sheets-Sheet 1
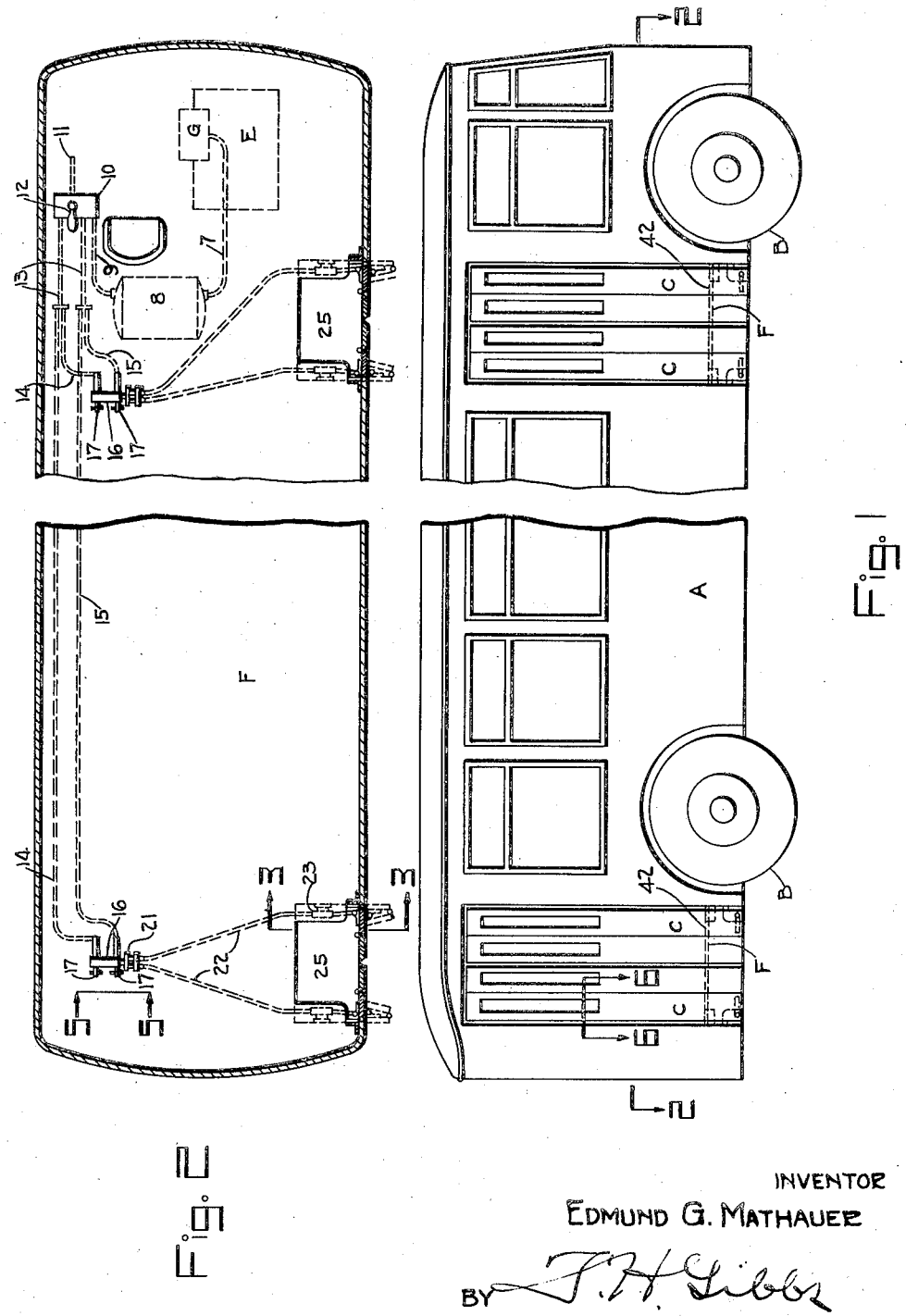
INVENTOR
EDMUND G. MATHAUER
BY *J. H. Gibbs*
ATTORNEY Oct. 16, 1934.  E. G. MATHAUER  1,977,284
CABLE ACTUATED DOOR MECHANISM
Filed June 20, 1933   3 Sheets-Sheet 2
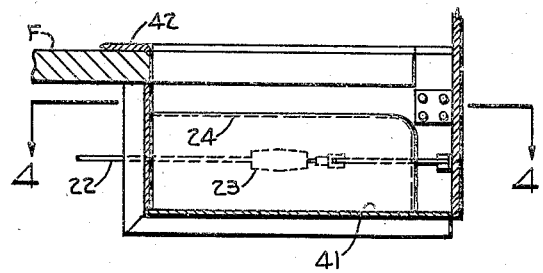
Fig. 3
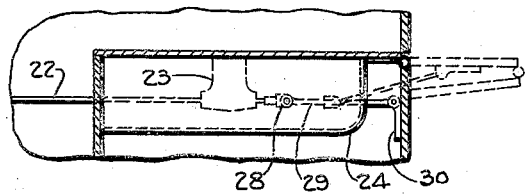
Fig. 4
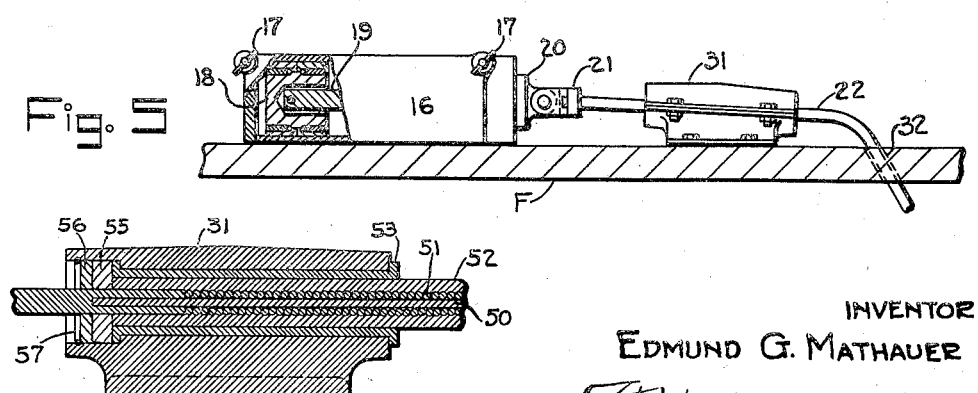
Fig. 5
Fig. 7
INVENTOR
EDMUND G. MATHAUER
BY J. H. Gibbs
ATTORNEY

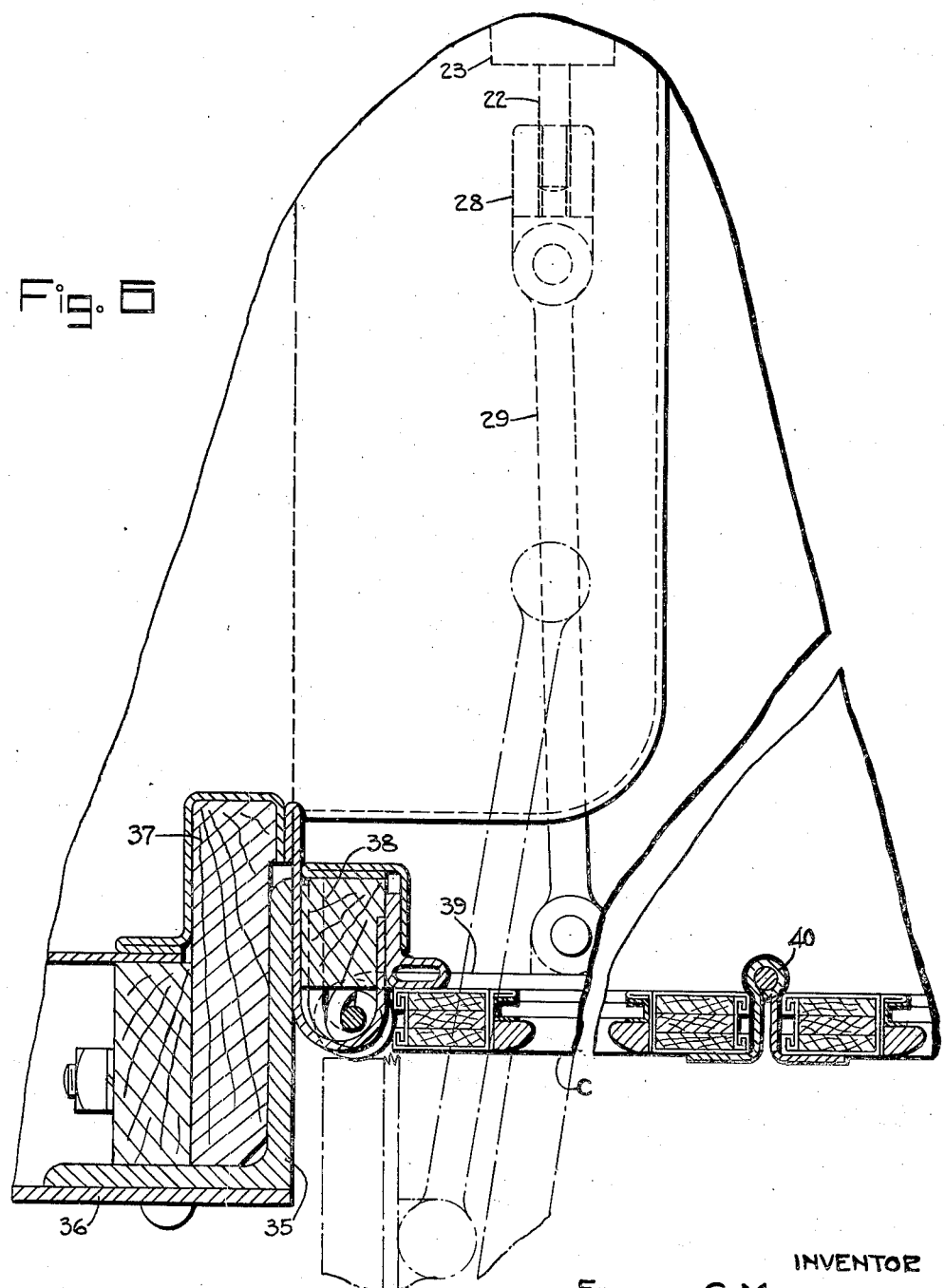

Patented Oct. 16, 1934

1,977,284

UNITED STATES PATENT OFFICE 1,977,284

CABLE ACTUATED DOOR MECHANISM

Edmund G. Mathauer, Philadelphia, Pa., assignor to American Car and Foundry Motors Company, New York, N. Y., a corporation of Delaware Application June 20, 1933, Serial No. 676,647

2 Claims. (Cl. 268—20)

This invention relates to method and means for operating the side doors of vehicles either of the surface car type or buses, and may be employed on rail cars or other vehicles.

It is an object of the invention to simplify the mechanism employed for opening and closing the side doors of such vehicles, to place the actuating mechanism which requires no attention under the floor of the vehicle and to place the parts which sometimes require servicing above the floor line where such parts are readily accessible for servicing.

It is also an object of the invention to remove the door actuating mechanism from the conventional position commonly occupied by the engine and associated parts, that is, over the door opening, and place the same in a position where conveniently accessible and at the same time avoid danger of contact of passengers therewith.

Referring to the drawings in which similar characters of reference indicate corresponding parts, Figure 1 is a side elevational view of a bus equipped with the invention, parts being broken away for convenience.

Figure 2 is a sectional plan view, the section being taken on line 2—2 of Figure 1 looking downwardly as indicated by the arrows.

Figure 3 is a partial vertical sectional view taken through the step well of the vehicle, on line 3—3 of Fig. 2.

Figure 4 is a plan view of the parts shown in Figure 3, the plan being taken on the line 4—4 of Figure 3.

Figure 5 is a view in which the floor is shown in section with the pneumatic engine mounted thereon, the engine being shown partly broken away to illustrate the details hereinafter referred to; and Figure 6 is a greatly enlarged detail of corresponding parts shown in plan in Figure 2, the parts in the present instance being near the extreme left hand side of the step well shown at the left side of the structure illustrated in Figure 2.

Fig. 7 illustrates a section through the guide 31.

Referring to the parts, A indicates a bus equipped with the present invention, B the wheels which may be either flanged or otherwise, as may be desired, C indicates the outwardly folding doors adapted to be actuated by the mechanism hereinafter more fully described, and E indicates an engine of any type, which, for convenience, is shown near the right hand or front end of the vehicle, but which may be positioned at any point either above the floor or below the floor thereof. In the present instance the engine is shown as positioned below the floor F. G indicates an air compressor actuated by the engine E adapted to supply air through the conduit 7 to the storage tank 8 and supply compressed air through the conduit 9 to the control valve 10 which, for convenience, has an exhaust line 11 leading to the atmosphere and a handle 12 for manipulating the valve which may be of the type illustrated in Letters Patent No. 999,246 of August 1, 1911 or any other suitable form which will answer the purpose.

Leading from the valve 10 are conduits 13, which, through branch lines 14, lead to the rear or inner ends of pneumatic engines 16, and which through branch lines 15 lead to the front or outer ends of pneumatic engines 16. Engines 16 are equipped with relief valves 17 and the engines and immediately associated parts are positioned above the level of the floor F.

Referring to Figure 5, it will be noted that the pneumatic engine 16 is equipped with a piston 18, piston rod 19 and piston rod extension 20 connected with a header 21 from which extend the semi-flexible cables 22. Said cables 22 are supported in guide brackets 23 which may be within suitable housings 24 if desired, either within the step wells 25 or suspended at the outer sides of said step wells, as may be desired, depending to a great extent upon the relative width of the step wells and the doors to be actuated.

Connected to the extreme outer end portions of the semi-flexible cables 22 are couplings 28 with which are pivotally connected the links 29 which are connected at one end with said couplings 28 and at their opposite ends with the hinge brackets 39 which are secured to the inner faces of the doors C.

It will be observed that all of the actuating parts hereinbefore referred to, with the exception of the valves, engines, headers, and the immediate connections with the doors, are positioned below the floor and are thus out of sight of the passengers and occupy no valuable space within the vehicle.

To permit placing the pneumatic engines above the floor line, the semi-flexible cables 22 between the headers 21 and the doors are conducted through guides 31, bolted or otherwise secured to the upper surface of the floor F. The cables 22 are then conducted through openings 32 in the floor downwardly below the floor and to the guide brackets 23 hereinbefore referred to.

Referring more particularly to Figure 6, it will be noted that the corner post 35 of the vehicle has connected with it a sheathing 36, a filler 37, the door hinge strap 38 and other functional parts common in railway and road vehicles, while another hinge strap 39 is connected directly to the doors C. Each group of doors comprises two sections hinged together as at 40 in Figure 6, so as to fold outwardly when open as shown in dotted lines in Figures 2, 4 and 6.

The flexible cable and the member 31 are shown in exaggerated section in Figure 7, in which it will be noted that the wire 50 is sheathed within a continuous coil spring 51 and within the outer protective sheathing 52 which is also flexible.

The well-known Bowden wire may be used for this purpose.

As illustrated in Figure 7, the protective sheathing 52 is enclosed in a ferrule 53 which is inserted in the longitudinally split member 31 before said member is secured in position in the car or bus.

To secure the ferrule 53 in position, a fibre disc 55 is inserted in a recess formed in one end of the member 31, for the purpose of preventing the ingress of dust, etc., within the ferrule 53, thereby making it more difficult to move the actuating wire assembly. This felt disc is held in position by the metal disc 56 which in turn is held locked in position by the split ring 57, all as clearly shown in Figure 7.

The step well is of the conventional type employed in both rail and road vehicles and is provided to facilitate ingress and egress to and from the vehicle. To that end a depressed floor portion 41 is employed which is a convenient distance below the normal floor F to assist in descending therefrom.

To prevent slipping, a conventional anti-slip tread portion 42 is secured in position around the step well opening as shown in Figure 3.

It has been found that mechanism of the class hereinbefore referred to is much simpler, easier to install and to operate than the devices conventionally used for the purpose, in addition to which there is a considerable saving of weight, all of which contributes to an economy of manufacture.

In accordance with the provisions of the patent statutes, the best embodiment of the invention has been described, but it is to be understood that the drawings are only illustrative and that the invention could be carried out by other means, for example, within the scope of the following claims.

What I claim is:

1. In a vehicle provided with a doorway and a step-well, door posts, a pair of doors hingedly connected with the door posts and adapted to close the doorway, a floor for the vehicle, a pneumatic engine mounted on the floor and including a piston and a piston rod, a compressed air receptacle, means for maintaining a supply of compressed air in said receptacle, valve means for controlling passage of compressed air from the receptacle, conduits leading from the valve means to opposite sides of the piston respectively, housings at opposite sides of the step-well, a guide in each housing, and resiliently flexible cables connected with the piston rod and arranged in said guides and connected respectively with the doors, said cables being adapted to open and close said doors upon operation of said piston.

2. In a vehicle provided with a doorway and a step-well, door posts, a pair of doors hingedly connected with the door posts and adapted to close the doorway, a pneumatic engine in the vehicle including a piston and a piston rod, a supply of compressed air in the vehicle connected with said engine, valve means for controlling passage of compressed air to said engine, and resiliently flexible cables connected with the piston rod and extending to and connected with the doors adjacent the step-well, said cables being adapted to open and close said doors upon operation of said piston.

EDMUND G. MATHAUER.